Nov. 4, 1969     A. TRUHAN     3,475,949

GAS METER CALIBRATION APPARATUS

Filed July 20, 1967     3 Sheets-Sheet 1

INVENTOR
ANDREW TRUHAN

BY *Stowell & Stowell*

ATTORNEYS.

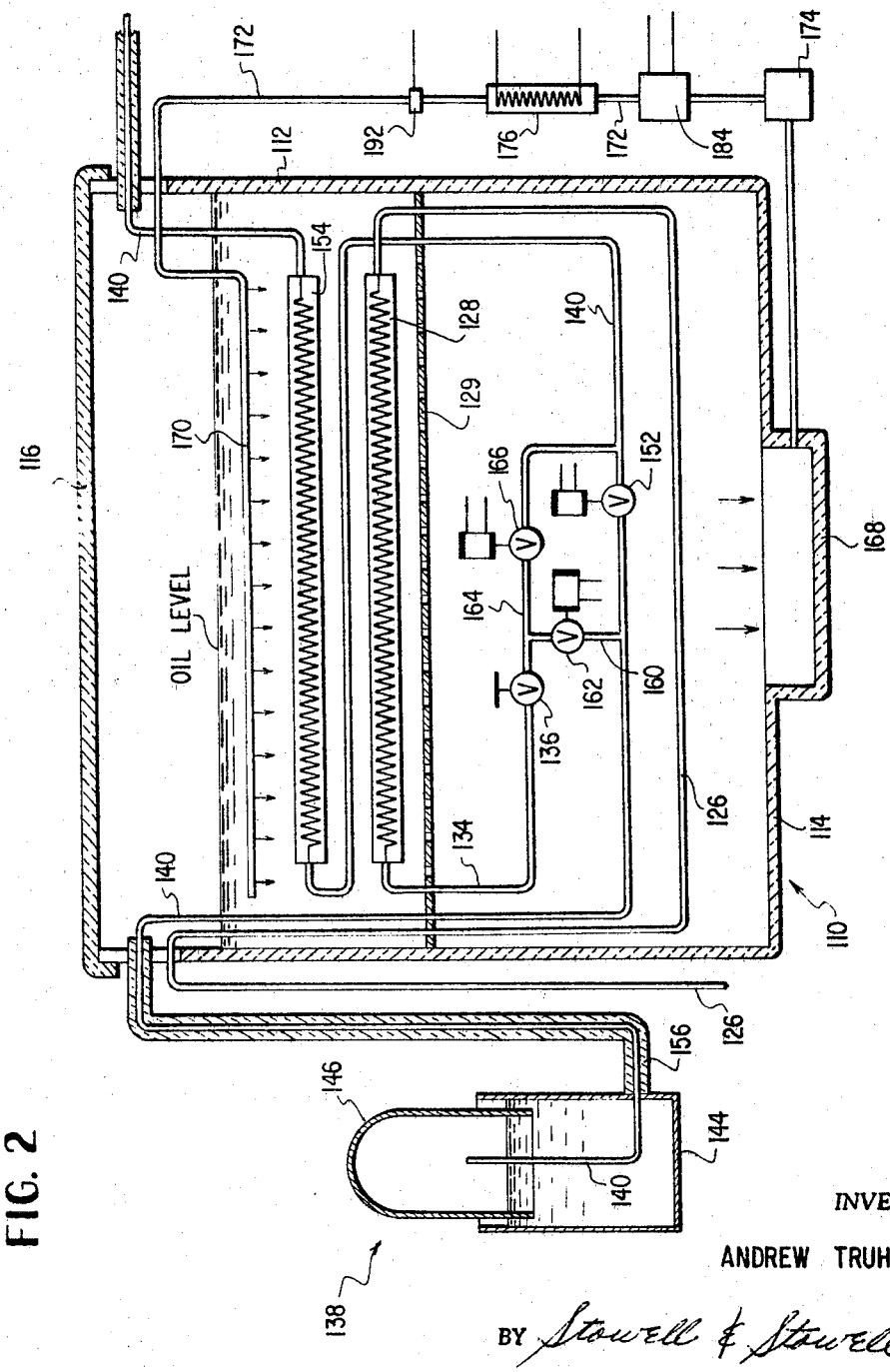

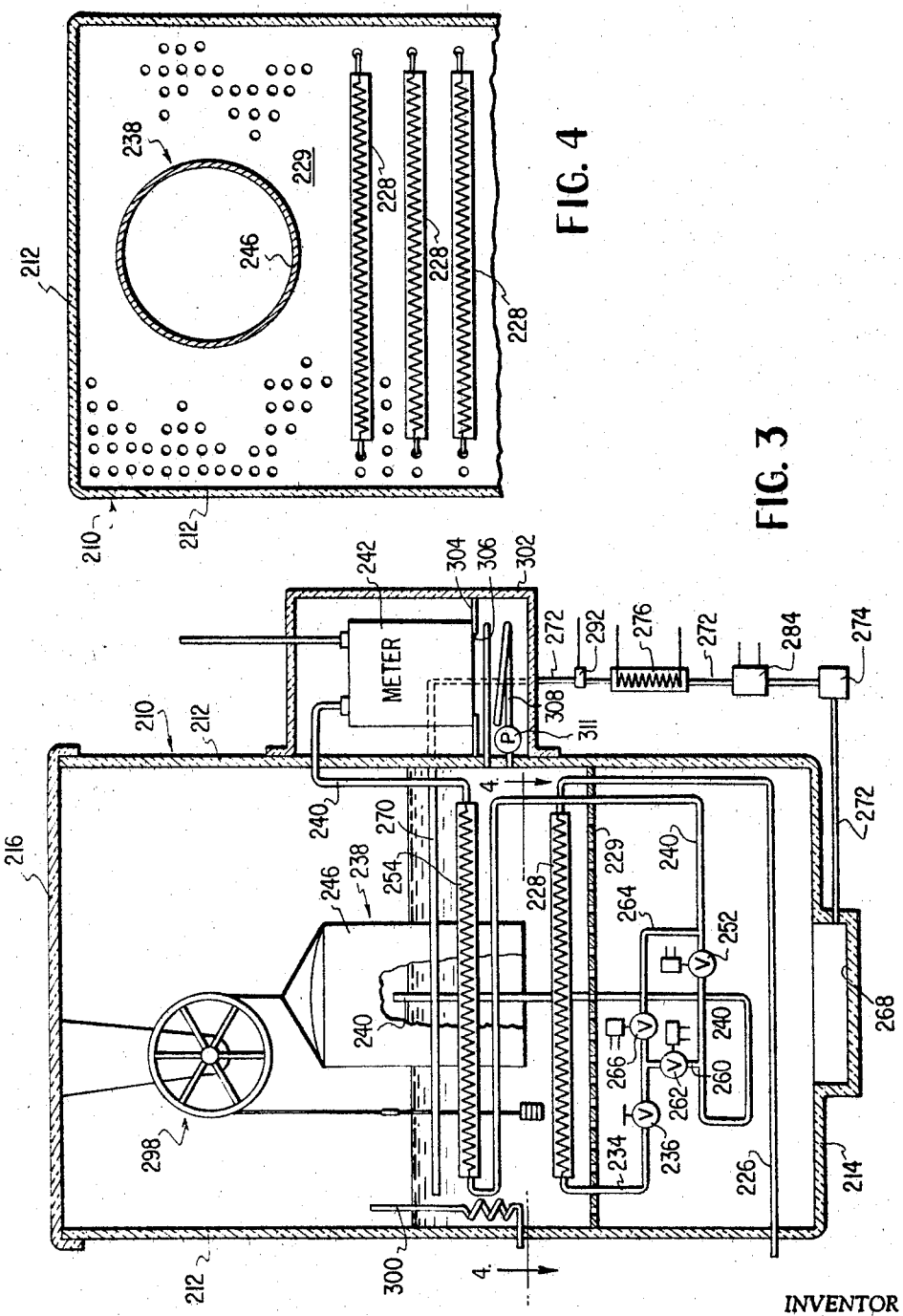

United States Patent Office 3,475,949
Patented Nov. 4, 1969

3,475,949
GAS METER CALIBRATION APPARATUS
Andrew Truhan, R.D. 3, Box 392T,
Somerset, N.J. 08873
Filed July 20, 1967, Ser. No. 654,813
Int. Cl. G01f 25/00
U.S. Cl. 73—3        8 Claims

ABSTRACT OF THE DISCLOSURE

Means are provided for maintaining the temperature of proving gas in a gasmeter calibration system at a predetermined temperature by immersing at least the gas flow conduits in a liquid bath whose temperature is controlled by immersed heating and cooling coils. The system may also include a gas bypass to provide means to purge the system prior to actual meter calibration.

BACKGROUND OF THE INVENTION

This invention relates generally to instrument proving or calibrating devices and more particularly to such devices adapted to calibrate volume or rate-of-flowmeters.

In the prior art, a conventional calibration technique involves passing a known volume of gas through a meter to be calibrated. The calibration is accomplished by comparing the meter reading to the known volume passed therethrough. One of the primary problems involved with prior art provers of the type to which this invention pertains lies in an inability to control the temperature of the volume of gas passed through the meter during a calibration. Since variations in temperature between the volume at the time of measuring and at the time of passage through the meter introduce errors into the calibration technique, prior art practices are inaccurate unless some effort is made to maintain the temperature constant throughout the apparatus. Attempts have been made in the prior art to control the tempearture by locating the apparatus in a temperature controlled room, however, it is difficult to maintain a temperature equilibrium within 1 or 2° F. throughout a large room. Furthermore, the soaking time required to bring the meters to a temperature equal that of the room entails substantial delay in the calibration operation, particularly during seasons of extreme weather conditions. Even after overcoming the above difficulties, the difference of a degree or two in temperature will introduce substantial errors in the calibration. Some prior art devices attempt to overcome the above disadvantages by measuring the temperature differential and calculating the change in volume imposed by the temperature change, however, such devices require relatively expensive and complicated electronic equipment.

An additional calibration problem in prior art devices lies in the fact that a gas of a different composition and/or temperature than the test gas may be present in the meter before calibration, which gas, unless purged, will introduce further errors into the calibration process.

SUMMARY OF THE INVENTION

This invention provides a novel apparatus for calibrating gas meters by providing means to discharge a known volume of gas through a meter to be calibrated. Means are provided in the apparatus to maintain a known volume at a substantially constant temperature and means are also provided to purge the meter and lines attached thereto with a volume of gas at a controlled temperature.

It is an object of this invention to provide a calibration device for gas meters of the highest accuracy possible by furnishing means to closely control the volume of the test gas sent through the meter by the device.

It is another object of this invention to provide a calibration device for gas meters which closely controls the volume of the test gas by furnishing means to control both the pressure and temperature thereof.

It is a further object of this invention to provide a simple and durable calibration apparatus for gas meters which may be readily removed for servicing or replacement, by providing centralized feeder points for connection thereof to the meter, source of power and to the controls therefor.

It is still another object of this invention to furnish an accurate prover for gas meters in which the entire stream of gas flowing through the meter is maintained at constant temperature and composition by providing means to purge the meter and the lines to the meter prior to calibration.

These and the other objects of this invention will become more apparent to those skilled in the art by reference to the following detailed description when viewed in light of the accompanying drawings.

BRIEF DESCRIPTION OF THE DRAWINGS

FIGURE 2 is a schematic view of another calibration apparatus in accordance with the invention;

FIGURE 3 is a schematic view of yet another calibration apparatus in accordance with the invention; and FIGURE 4 is a sectional view, taken along the line 4—4 of the apparatus of FIGURE 3.

DESCRIPTION OF THE PREFERRED EMBODIMENTS

Figure 1:
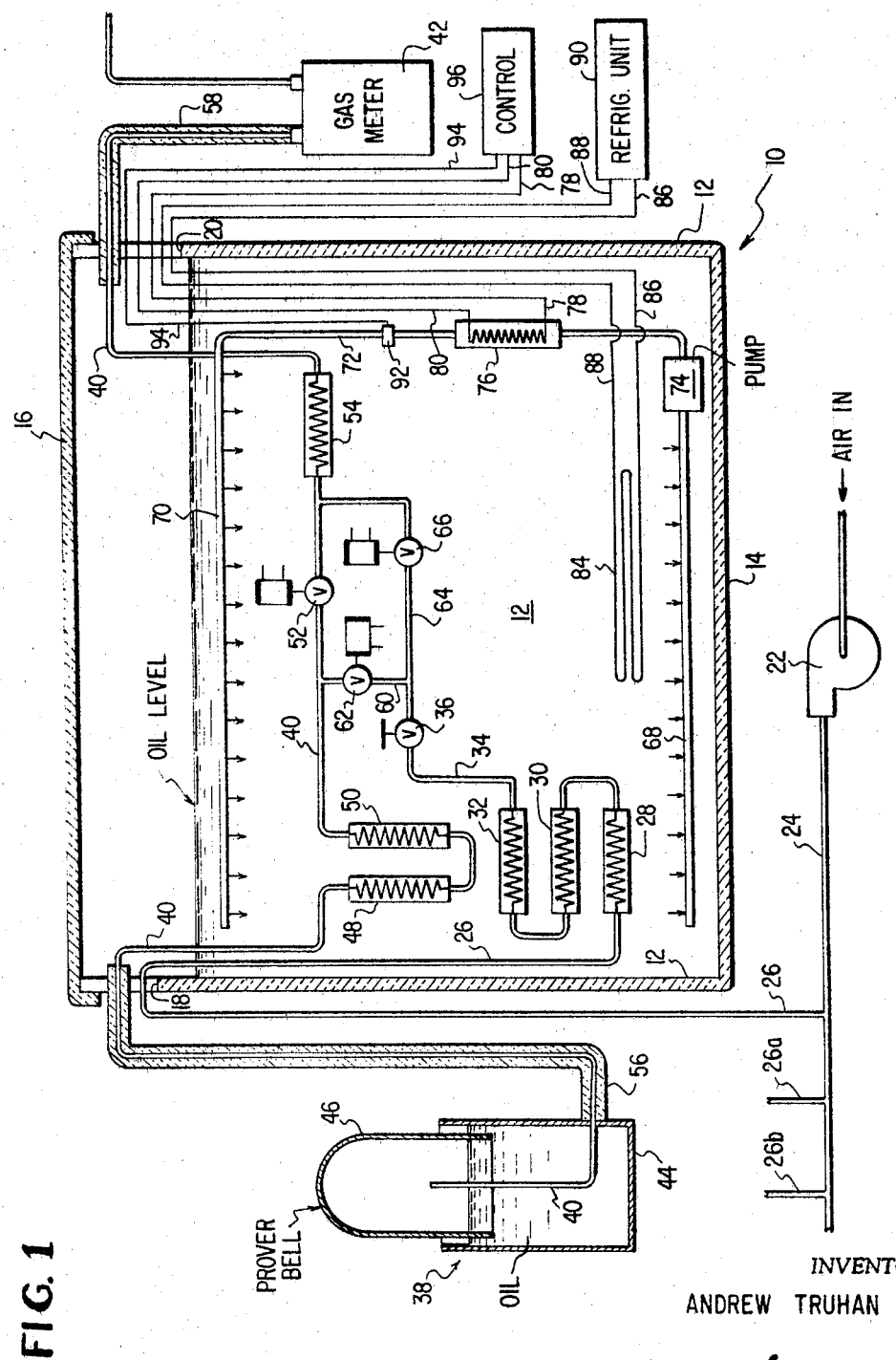
FIGURE 1 is a schematic view of a calibration apparatus in accordance with the invention.

Referring now to FIGURE 1 of the drawings, a tank 10 comprises insulated walls 12 and an insulated bottom 14 provided with a removable insulated top 16. Openings 18 and 20 are provided through the upper edges of at least two opposed side walls 12 to provide for ingress and egress of conduits and conductors to be described hereinafter.

A source of gas supply such, for example, as a fan or blower 22 is connected, through a manifold 24, with a gas feed conduit 26. The feed conduit 26 enters the tank 10 through the opening 18 and is connected, in series, to inlet heat exchangers 28, 30 and 32. The manifold 24 may be connected to additional tanks (not shown) through successive feed conduits such, for example, as 26a and 26b. The final inlet heat exchanger 32 is connected, through a conduit 34, to a pressure regulating valve 36. The valve 36 is preferably a manually adjustable pressure regulating valve of any type well known in the art and serves to regulate the pressure of gas in the system as will be described hereinbelow.

Means for providing a measured volume of air, such as a prover shown generally at 38, is connected, through a tank-traversing conduit 40 to a gas meter 42. The prover 38 comprises a liquid containing prover tank 44 having a terminal portion of the conduit 40 coaxially and vertically disposed therein, and a prover bell 46 disposed in the tank in such a manner as to enclose the upper end of the conduit generally function to provide a measured volume of gas as determined by the location of displacement markings on the side of the prover bell. The conduit 40 enters the tank 10 through the opening 18 and is connected in series with a pair of initial heat exchangers 48 and 50, a test charge control valve 52, and a final heat exchanger 54. The conduit 40 exits from the tank through the opening 20 and is connected to the gas meter 42. The portion of the conduit 40 between the prover 38 and the opening 18, as well as that portion between the opening 20 and the gas meter 42, are provided with insulating sleeves 56 and 58 respectively. A transfer conduit 60, controlled by a remotely operated valve 62, connects the conduit 34 and the pressure regulating valve 36 to the conduit 40 upstream of the valve 52 while a purge bypass conduit 64, controlled by a remotely operated valve 66, provides connection therefor to the conduit 40 downstream of the valve 52.

The aforedescribed heat exchange and valving structure is submerged in a liquid bath disposed in the tank 10, the liquid acting as a heat transfer and insulating medium for purposes to be described hereinafter. Inlet and outlet headers 68 and 70, provided with a plurality of intake and discharge orifices and interconnected by conduit 72, are disposed near the bottom and the surface of the bath in the tank 10 to be immersed beneath the surface of the liquid. A pump 74 is disposed in the conduit 72 between the headers to continually circulate liquid from the lower portion of the tank to the upper portion of the tank as is indicated by the arrows in the drawing. A source of heat, preferably an electric heating coil 76, is disposed around the conduit 72 and is connected, through conductors 78 and 80 exiting the tank 10 through the opening 20, to a control 96. A temperature sensing device, such, for example, as a thermistor 92, is associated with the conduit 72 on the downstream side of the heating coil 76 and is connected, by a conductor 94, to the control unit 96. The control 96, in turn, regulates the output of the heating coil 76 according to the liquid temperature desired in the tank 10. A cooling coil 84 is disposed proximate the lower portion of the tank 10 and is connected, through cooling conduits 86 and 88 exiting the tank 10 through the opening 20, to a refrigeration unit 90. The refrigeration unit 90 preferably is set to provide constant cooling of the bath, at a pre-set or manually adjustable value, the heating coil 76 being relied on to raise the temperature of the bath to the desired level as dictated by the thermistor 92.

The aforedescribed heating, refrigeration and control units may be of any of the standard types known in the art suitable to provide a system which functions to adequately control and maintain temperature within the tank at a desired level.

The liquid in the tank may be of any suitable type which will serve as a heat transfer and insulating medium, such, for example, as petroleum oil or the like. In the preferred embodiment, air is utilized as a proving medium, however, any gas suitable for the purpose may be used.

In operation, the pressure regulating valve 36 is set to provide the desired pressure for the proving system. The tank 10 is then filled with fluid to, at least, submerge the header 70, and the gas meter 42 is then attached to the free end of the conduit 40. The control 96 is then adjusted to the desired temperature and the heating and refrigeration units are energized to furnish heat and cooling to the fluid, the level of heat required being dictated by a temperature signal from the thermistor 92. The pump 74 is then energized to initiate circulation of the fluid in the tank 10 and sufficient time is allowed for the temperature throughout the fluid to reach equilibrium. The fan 22 is then energized to supply gas under pressure to the system.

Solenoid actuated valves 52, 62 and 66 are connected by suitable electrical conduits to control switches maintained externally of the container 12. The switches are not shown in the drawing. It will also be particularly noted that the valves 52, 62 and 66 are not in vertical alignment, therefore, the heat generated upon electrical actuation of the valves is distributed more uniformly in the moving liquid bath, thus aiding in the maintenance of uniform temperature conditions within the bath. Further, it will be noted that the said valves and their actuators are positioned remote from the heat exchangers 28, 30, 32, 48, 50 and 54.

If any portion of the system maintained in container 12 fails to function properly, the entire unit is simply removed through the top opening and the associated ports 18 and 20.

In initiating a test, with all of the valves, with the exception of the regulating valve 36, in a closed condition, gas is supplied under pressure from the fan 22 through the manifold 24, conduit 26, heat exchangers 28, 30 and 32, conduit 34, up to the valves 62 and 66 in the transfer and purge conduits 60 and 64 respectively. The valve 66 is then opened for a period of time sufficient to allow gas to flow therepast through the heat exchanger 54 and conduit 40 to purge the aforedescribed conduits, valves and the gas meter 42.

Once the system has been purged, the valve 66 is closed, and the valve 62 is opened for a period of time sufficient to allow the required test volume of gas, at a pressure regulated by the valve 36, to collect in the prover bell. As is known in the art, the bell 46 is calibrated so that the volume of gas contained therein is reflected by the elevation thereof with respect to a fixed reference point, such for example, as the upper edge of the prover tank 44. The test volume of gas in the prover bell is substantially at the temperature desired for calibration due to the action of the heat exchangers 48 and 50 thereon and the insulating properties of the insulation 56 around the conduit 40. When the desired volume of gas is collected in the prover bell 46, the valve 62 is closed and the device is ready for calibration of a meter connected thereto.

Calibration is achieved by opening the valve 52 to allow the gas in the prover bell 46 to be transmitted through the conduit 40 from the bell, through the heat exchangers 48 and 50, valve 52, and heat exchanger 54 to the gas meter 42. Gas flow through the conduit 40 is effected by gravity acting to draw the prover bell 46 downward when the valve 52 is opened. The heat exchanger 54 provides final adjustment of temperature of the gas flowing therethrough to provide a sufficient temperature of the gas flowing through the conduit 40 to the meter substantially equal to the temperature of the gas in the bell 46. The insulation 58 aids in maintaining the test volume gas at the desired temperature after final adjustment.

By passing a test volume or dose of gas through the meter at a known volume and a known temperature, the meter reading can be compared to the known volume or rate and the meter can thereby be corrected or calibrated, as desired.

In FIGURE 2 a variation of an apparatus in accordance with the invention is shown. In this embodiment, components thereof corresponding to like components of the embodiment of FIGURE 1 are indicated by like numerals only of the next higher order. The primary distinction between the embodiment of FIGURE 2 and that of FIGURE 1 is in the arrangement of the components thereof in such a manner that the valve apparatus is thermodynamically isolated from the heat exchange apparatus. The heating, cooling and pumping units are also removed from the fluid bath and located externally thereof.

The apparatus comprises a fluid bath containing tank 110 made up of walls 112, a bottom 114 and a removable top 116. Gas enters the fluid bath through a feed conduit 126 which is connected to an inlet heat exchanger 128 disposed proximate the upper portion of the tank. A perforate plate 129 is disposed in the tank 110 in such a manner as to divide the tank into upper and lower portions. A conduit 134 communicates with the outflow end of the heat exchanger 128 and, through the plate 129, to a pressure regulating valve 136.

A prover, shown generally at 138, is communicative with a conduit 140, which conduit traverses the bath in the tank 110, exiting on the opposite side thereof for connection to a gas meter (not shown). The prover 138 comprises a fluid containing prover tank 144 with a prover bell 146 disposed therein in a manner similar to and for the same purposes as the prover 38 of the embodiment of FIGURE 1. The conduit 140 is provided with a remotely operable discharge control valve 152 and a final heat exchanger 154.

A transfer conduit 160 interconnects the conduits 134 and 140 and flow therethrough is controlled by a remotely operable valve 162. A purge bypass conduit 164, controlled by a remotely operable valve 166, is disposed between the transfer conduit 160 and the conduit 140, by-passing the valve 152.

As can be seen by reference to the figure, the above-described valve structure and interconnecting conduiting is disposed in the lower portion of the tank 110 beneath the plate 129 and remote from the heat exchangers 128 and 154. In this manner thermodynamic disturbances caused by operation of the valves are isolated from the area surrounding the heat exchangers 128 and 154.

The tank 110 is provided with a sump 168 in the bottom wall 114 and an outlet header 170 is disposed across the top portion thereof. The sump 168 and header 170 are interconnected by a conduit 172 which has, disposed in series, a pump 174, cooling coil 184, heating coil 176 and temperature sensing thermistor 192. The aforedescribed units are connected to controls and refrigeration units through suitable conduiting and conductors in the same manner as that of the embodiment of FIGURE 1 described above.

The operation of the embodiment of FIGURE 2 is essentially the same as that described in the operation of the embodiment of FIGURE 1. The pressure regulating valve 136 is preset to provide a desired pressure for the proving system and the tank 110 is then filled with fluid to submerge the header 170. With the heating and cooling units energized and the controls adjusted as described in the embodiment of FIGURE 1, the pump 174 is energized to initiate circulation of the fluid through the tank 110 and sufficient time is allowed for the temperature to equalize throughout the fluid. Gas under pressure is then supplied to the system through the conduit 126.

In initiating the test, again with all of the valves with the exception of the regulating valve 136, in a closed condition, gas pressure is supplied up to the valves 162 and 166 and the transfer and purge conduits 160 and 164 respectively. The valve 166 is then opened and allowed to remain open for a period of time sufficient to purge the heat exchanger 154 and that portion of the conduit 140 upstream of that valve.

After the system has been purged, the valve 166 is closed and the valve 162 is opened for a sufficient time to transmit the required test volume of gas to the prover 138. When that volume of gas is collected in the prover bell 146, the valve 162 is closed and the device is ready to calibrate a gas meter.

Calibration is accomplished by opening the valve 152 to allow the gas in the prover bell 146 to be transmitted through the conduit 140, valve 152 and the heat exchanger 154. The heat exchanger 154 provides final adjustment of the temperature of the gas flowing therethrough to provide a temperature level in the gas flowing through the conduit 140 to the meter substantially equal to the temperature of the gas in the bell 146.

Referring now to FIGURES 3 and 4, another variation of a device in accordance with the invention is illustrated. In this embodiment, components thereof corresponding to like components of the embodiments described in the preceding figures are indicated by like numerals only of the next higher order. The primary distinction between the embodiment of FIGURES 3 and 4 is in the provision of means to control the temperature of both the prover bell and the gas meter to be calibrated.

In the figures a tank 210, comprising insulated walls 212, a bottom 214 and a removable top 216, encloses a fluid bath as in the aforedescribed embodiments. A feed conduit 226 enters the bath proximate the lower end of the tank 210 and communicates with an inlet heat exchanger 228. A perforate plate 229 is disposed in the tank 210 in such a manner as to divide the tank into upper and lower portions. A conduit 234 communicates with outflow end of the heat exchanger 228 and, through the plate 229, to a pressure regulating valve 236.

A prover, shown generally at 238, is disposed within the confines of the tank 210 proximate the upper portion thereof. A conduit 240 extends from above the upper surface of the bath contained within the tank 210, traversing the tank through a final heat exchanger 254, and exiting through the tank wall 212 for connection to a gas meter 242. The prover 238 comprises a prover bell 246 suspended from the tank top 216 by a pulley and counterweight arrangement 298 to coaxially enclose the free end of the conduit 240. The bell 246 is partially immersed in fluid bath contained within the tank 210 and functions in a manner similar to and for the same purposes as described for the prover 38 in the embodiment of FIGURE 1. As the bell 246 is raised or lowered, the volume of the free space surrounding the bell within the upper portion of the tank 210 is necessarily varied. To compensate for this change, a bleed conduit 300, having a portion thereof deformed into a coil for heat exchange purposes, is disposed through a side wall 212 to extend above the upper surface of the bath and communicate the space above the bath with the ambient atmosphere. As the bell 246 is raised, thereby decreasing the volume in the space, air from the space is exhausted through the conduit 300. As the bell is lowered, thereby increasing the volume in the space, air is taken in through the conduit 300. The heat exchange portion of the conduit serves to bring the temperature of the incoming air to substantially that of the temperature in the interior of the tank 210.

A transfer conduit 260 interconnects the conduits 234 and 240, the flow therethrough being controlled by a remotely operable valve 262. A purge bypass conduit 264, controlled by a remotely operable valve 266, is disposed between the transfer conduit 260 and the conduit 240, bypassing the valve 252.

As was described for the embodiment of FIGURE 2, it can be seen that the valve and conduiting structure is disposed in the lower portion of the tank 210 beneath the plate 229, remote from the heat exchangers 228 and 254, thereby eliminating thermodynamic disturbances caused by operation of the valves.

The tank 210 is provided with a sump 268 in the bottom wall 214 and an outlet header 270 is disposed across the upper portion thereof. The sump 268 and the header 270 are interconnected by a conduit 272 which has, disposed in series, a pump 274, a cooling coil 284, a heating coil 276 and a temperature sensing thermistor 292. The aforedescribed units are connected to controls and refrigeration units through suitable conduiting and conducted in the same manner as that of the embodiment of FIGURE 1 described above.

An insulated housing 302 is formed around the gas meter 242 to provide an insulated enclosure therefor. The gas meter 242 is mounted on a shelf 304 disposed in the housing 302, the shelf having an opening 306 beneath the meter. A coil 308, communicating with the interior of the tank 210 and the fluid bath contained therein, is disposed in the space beneath the shelf 304 and is provided with a circulating pump 311 to continuously circulate fluid from the interior of the tank 210 within the housing 302. By use of the above-described apparatus, the interior of the housing 302, and thereby the meter 242, may be maintained at a temperature substantially equal to that of the interior of the tank 210.

It should be obvious that the meter may be physically disposed within the tank 210, if so desired, or other types of temperature equalizing means may be utilized to maintain the area surrounding the meter at a temperature equivalent to that in the tank.

With the exception of the use of the circulating pump 311 and the coil 308, the operation of the embodiment of FIGURES 3 and 4 is identical to that of the operation of the embodiment of FIGURE 2. The primary benefit realized by the incorporation of the variations shown in the embodiments of FIGURES 3 and 4 is the maintenance of a constant temperature level for the prover gas, not only in the prover bell 246 and the transmitting lines, but in the meter 242 to be calibrated.

What has been set forth above is intended primarily as exemplary of a teaching in accordance with the invention to enable those skilled in the art in the practice thereof. It should, therefore, be understood that the invention may be practiced other than as specifically described. What is new and, therefore, desired to be protected by Letters Patent of the United States is:

1. A calibration apparatus for gas meters comprising:
   an outlet adapted to be connected to a meter to be calibrated;
   measuring means adapted to be connected to a source of pressure for receiving and dispensing a volume of gas through said outlet;
   pressure regulating means associated with said measuring means to regulate the pressure of gas therein;
   a liquid bath, and heat adjusting means to regulate the temperature of said bath; said heat adjusting means comprising means to circulate the liquid in said bath to maintain a substantially constant temperature profile therein; and heating and cooling means to regulate the temperature of said bath; and
   heat exchange means immersed in said bath and adapted to maintain a constant temperature in the gas between said outlet and said measuring means to maintain a constant volume therefor.

2. An apparatus in accordance with claim 1 wherein said measuring means comprises a prover bell movably disposed and partially immersed in said bath, a first conduit communicative with said source of pressure disposed in said bath and terminating within the confines of said bell, an insulated housing enclosing said bell and said bath to provide substantially constant temperature therebetween.

3. An apparatus in accordance with claim 2 wherein a second insulated housing is disposed proximate said first mentioned housing, said second housing adapted to enclose a gas meter to be calibrated therein, conduiting means including a heating coil and circulating pump disposed between said bath and the confines of said second housing to provide substantially constant temperature therebetween.

4. An apparatus in accordance with claim 1 wherein said means to circulate said liquid comprises an inlet disposed proximate the bottom of said bath, an outlet disposed proximate the upper surface of said bath, an interconnecting conduit between said inlet and said outlet, and a pump disposed to circulate liquid from said inlet to said outlet.

5. An apparatus in accordance with claim 4 wherein said cooling means comprises a cooling coil disposed in heat transfer relationship to said interconnecting conduit, a refrigeration unit connected to said cooling coil, said refrigeration unit removing heat from the fluid passing through said interconnecting conduit at a constant, predetermined rate.

6. An apparatus in accordance with claim 1 wherein said first conduit is also communicative with said outlet and an intermediate portion thereof is immersed in said bath;
   a first valve means disposed in the intermediate portion of said first conduit to control gas flow therethrough;
   a transfer conduit communicating with the intermediate portion of said first conduit between said first valve means and said measuring means;
   said heat exchange means comprising at least one first heat exchanger in said first conduit to provide heat exchange between said bath and the gas flowing through said first conduit;
   a second valve means in said transfer conduit to control flow of gas therethrough; and
   a second conduit adapted to communicate said transfer conduit with the source of pressure.

7. An apparatus in accordance with claim 6 wherein at least one second heat exchanger is disposed in said second conduit and immersed in said bath to provide heat exchange between said bath and the gas flowing through said second conduit.

8. An apparatus in accordance with claim 7 wherein said pressure regulating means comprises a pressure regulating valve disposed in said second conduit between said second heat exchanger and said transfer conduit.

References Cited

UNITED STATES PATENTS

| | | | |
|---|---|---|---|
| 1,508,519 | 9/1924 | Horne | 73—198 XR |
| 2,398,818 | 4/1946 | Turner | 73—23.1 XR |
| 2,795,950 | 6/1957 | Liddell | 73—3 |
| 2,841,005 | 7/1958 | Coggeshall | 73—23.1 |
| 2,987,911 | 6/1961 | McDonell | 73—3 |
| 2,991,647 | 7/1961 | Harris | 73—23.1 |

LOUIS R. PRINCE, Primary Examiner

JEFFREY NOLTON, Assistant Examiner